(12) United States Patent
Gomez et al.

(10) Patent No.: US 12,495,901 B2
(45) Date of Patent: Dec. 16, 2025

(54) POWERED VANITY PULLOUT

(71) Applicant: Hardware Resources, Inc., Bossier City, LA (US)

(72) Inventors: Joel Gomez, Garland, TX (US); Dennis McGregor, Dallas, TX (US)

(73) Assignee: Hardware Resources, Inc., Bossier City, LA (US)

( * ) Notice: Subject to any disclaimer, the term of this patent is extended or adjusted under 35 U.S.C. 154(b) by 107 days.

(21) Appl. No.: 18/595,180

(22) Filed: Mar. 4, 2024

(65) Prior Publication Data
US 2024/0260752 A1   Aug. 8, 2024

Related U.S. Application Data (63) Continuation-in-part of application No. 17/247,962, filed on Jan. 1, 2021, now Pat. No. 11,923,160.

(51) Int. Cl.
| | |
|---|---|
| *A47B 88/457* | (2017.01) |
| *A47B 67/00* | (2006.01) |
| *A47B 88/919* | (2017.01) |
| *H01H 3/16* | (2006.01) |
| *H01H 47/24* | (2006.01) |

(52) U.S. Cl.
CPC .......... *A47B 88/457* (2017.01); *A47B 67/00* (2013.01); *A47B 88/919* (2017.01); *H01H 3/161* (2013.01); *H01H 47/24* (2013.01); *A47B 2220/0077* (2013.01)

(58) Field of Classification Search
CPC ..... A47B 67/00; A47B 88/457; A47B 88/919; A47B 2200/0077; A47B 2200/0083; H01H 3/161; H01H 47/24; H05B 47/105
See application file for complete search history.

(56) References Cited

U.S. PATENT DOCUMENTS

| | | |
|---|---|---|
| D277,441 S | 2/1985 | Handley |
| 5,181,772 A | 1/1993 | Albiez |
| 5,246,285 A | 9/1993 | Redburn et al. |
| 6,523,918 B1 | 2/2003 | Baiza |
| 7,189,107 B1 * | 3/2007 | Strayer .............. H01R 13/6456 439/501 |
| 7,275,893 B2 * | 10/2007 | Rexius ..................... B60P 1/60 406/197 |
| 8,727,138 B2 | 5/2014 | Dittus et al. |
| 9,013,071 B1 | 4/2015 | Levi |
| 9,136,653 B2 | 9/2015 | Dickey |
| 9,331,430 B2 | 5/2016 | Dickey |
| 9,872,563 B2 | 1/2018 | Davis |
| 10,003,159 B2 | 6/2018 | Dickey |
| 10,205,283 B2 | 2/2019 | Dickey |
| 11,070,038 B2 | 7/2021 | Chambers et al. |

(Continued)

*Primary Examiner* — James O Hansen
(74) *Attorney, Agent, or Firm* — Schultz & Associates, P.C.

(57) ABSTRACT

A powered vanity system with a power outlet positioned on the bottom of a drawer box adjacent a face plate with an optical trigger that prevents the flow of electricity to the power outlet when the drawer box is in a closed position and allows the flow of electricity to the power outlet when the drawer box is in an open position. A cable manager controls the power cord as the drawer box moves between open and closed positions. The drawer box is easily removable from the cabinet carcass and provides for a novel convenience lighting system.

23 Claims, 8 Drawing Sheets

(56) References Cited

U.S. PATENT DOCUMENTS

| | | | |
|---|---|---|---|
| 2004/0051428 A1 | 3/2004 | Bartloff et al. | |
| 2009/0140620 A1 | 6/2009 | Zipp et al. | |
| 2010/0141106 A1* | 6/2010 | Chambers | A47B 88/40 312/334.44 |
| 2015/0335178 A1* | 11/2015 | Rahilly | E05B 47/00 312/209 |
| 2016/0270516 A1 | 9/2016 | Stephens et al. | |
| 2017/0177031 A1* | 6/2017 | Lesizza | A47B 88/994 |
| 2020/0373743 A1 | 11/2020 | Chambers et al. | |

\* cited by examiner

POWERED VANITY PULLOUT

CROSS-REFERENCE TO RELATED APPLICATIONS

This application is a continuation-in-part of U.S. application Ser. No. 17/247,962, filed Jan. 1, 2021, now U.S. Pat. No. 11,923,160, granted on Mar. 5, 2024. The patent application identified above is incorporated here by reference in its entirety to provide continuity of disclosure.

FIELD OF THE INVENTION

The present invention relates to power outlets moveably located in cabinet drawers.

BACKGROUND OF THE INVENTION

In many cases it is desirable to have a powered outlet located in a cabinet drawer. For example, powered bathroom or kitchen appliances are unsightly when stored on a cabinet countertop and are cumbersome to use if stored in an unpowered drawer. Therefore, the locations where the electrical devices can be used are limited. Locating an electrical cord within a drawer can increase the location possibilities for use of these electrical devices.

Several problems exist when locating a power outlet within a drawer. A first problem is that the drawer moves, creating the necessity of management of the cabling from the wall to the drawer. The wiring must be long enough to provide electricity when the drawer is fully extended. However, when the drawer is closed, excess wiring must be protected to prevent damage or entanglement. A second problem is the danger of fire if the drawer is closed and the electrical device is not deactivated.

One prior art solution is found in U.S. Pat. No. 9,136,653 to Dickey. The '653 Patent discloses sensors that detect temperature or the presence of dangerous compositions, like carbon monoxide, inside the drawer. If the temperature in the drawer or the concentration of the composition is too high, then a sensor will interrupt the flow of electricity to the outlet. This solution is not ideal because it requires sensors that are prone to failure.

Another is found in U.S. Pat. No. 9,331,430 to Dickey. Cable management systems are disclosed that occupy a significant amount of space behind the drawer. The result is a substantially decreased depth to the drawer and decreased storage capacity.

As a result, a need exists for a dependable, robust solution to provide a reliable compact cable management method in combination with a reliable method of deactivating electrical devices in a movable powered drawer.

SUMMARY OF THE INVENTION

The powered vanity system disclosed includes a movable drawer box mounted in a cabinet carcass by two telescoping drawer slides. One slide includes a cable arm bracket for attaching a cable management system to the slide. The other slide includes a novel strike bracket with a ramp for activating the power outlet.

The drawer box includes an outlet located at the front of the drawer for ease of access. A power cable is provided. The power cable is supported by the cable management system. The cable management system includes two extension arms which are attached to and articulate between the drawer and the cabinet carcass. One end of the cable management system is attached to the cable arm bracket attached to a slide. The other end of the cable management system is attached to the back of the drawer.

A pressure switch is installed on the bottom of the drawer box in a switch enclosure. The pressure switch includes a pressure switch arm. The pressure switch arm is positioned against the strike bracket. A switch cable is connected to the pressure switch and runs from the pressure switch to the outlet along the bottom of the drawer. In a preferred embodiment, a dimmer circuit is located between the pressure switch and the outlet and controls a convenience light housed in the outlet to create a pleasing aesthetic effect as the drawer is opened or closed.

In a preferred embodiment, the interior of the drawer box includes an angled implement tray which holds implement cannisters for storing bathroom or kitchen appliances.

In use, when the drawer box is opened, the pressure switch is activated by the strike bracket. The pressure switch closes the circuit and electricity flows to the outlet and the vanity lighting system.

When the drawer is closed, the pressure switch is deactivated by the strike bracket. The pressure switch opens the circuit and stops the flow of electricity to the outlet and activates a dimmer circuit to slowly fade the convenience lighting. Deactivating the circuit when the drawer is closed drastically reduces the risk of fire if the electrical device is on when the drawer is closed.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

The various aspects of the invention are positioned in the drawings in exemplary positions oriented to the left or to the right. One of skill will recognize that these positions may be reversed so long as the functionality of the components is maintained.

Figure 1:
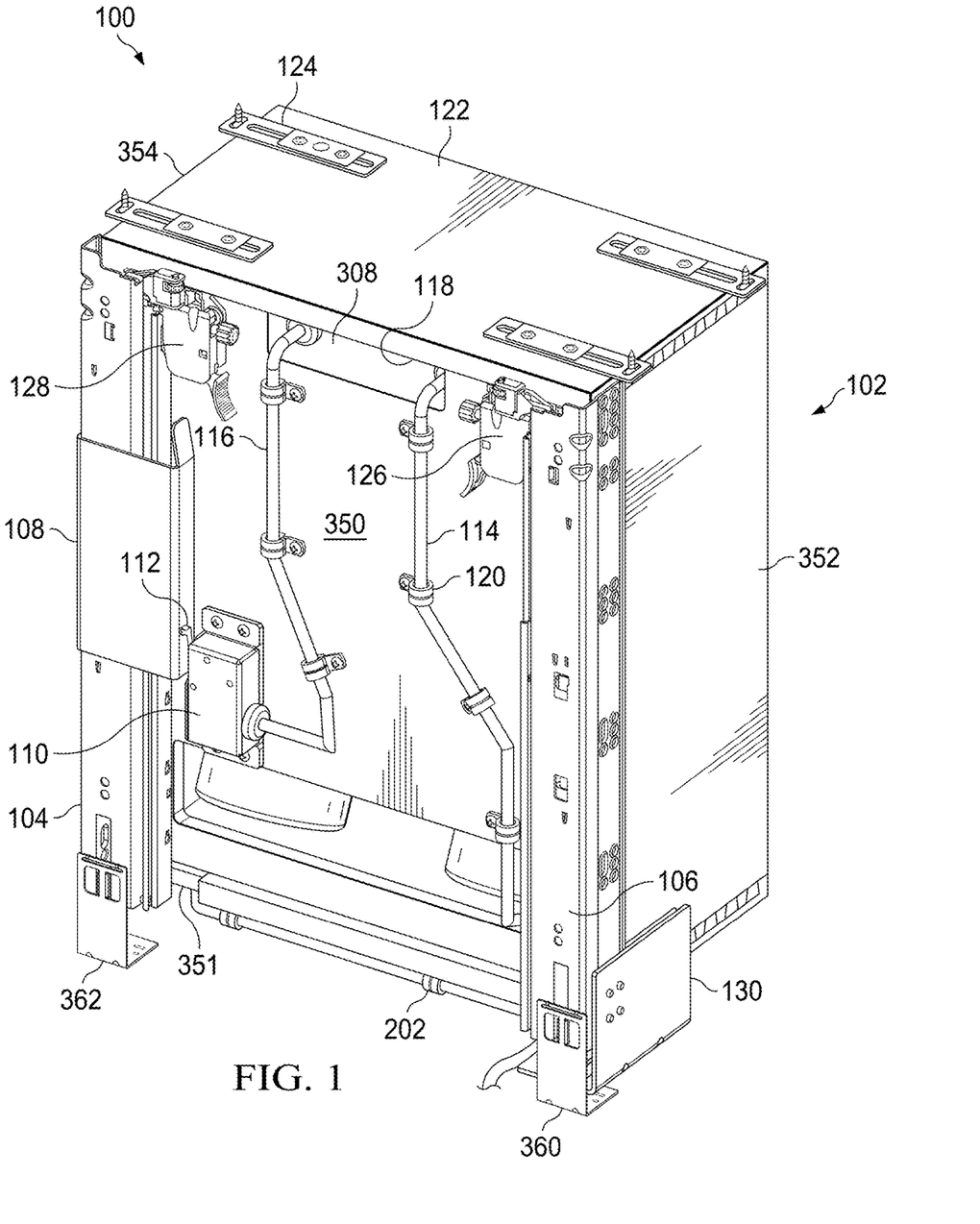
FIG. 1 is an isometric drawing of a preferred embodiment including a view of the underside of a drawer in a closed position.

In FIG. 1, the underside of powered vanity system 100 is shown. Powered vanity system 100 includes drawer box 102. The drawer box includes drawer face 122, left drawer side 354, right drawer side 352, drawer back 351 and drawer bottom 350. Drawer face 122 includes front panel attachment brackets 124 which attach a face plate (not shown) to the front of the drawer box.

The drawer box is attached to left drawer slide 104 by left slide attachment clip 128 and to right drawer slide 106 by right slide attachment clip 126. In a preferred embodiment, each of left drawer slide 104 and right drawer slide 106 are equipped with a "slow-close" spring damper mechanism, as known in the art, so as to smooth the mechanical retraction of the drawer into a closed position when the drawer face is positioned within about 2" from the cabinet face. U.S. Pat. No. 9,872,563 to Davis discloses a "slow close" spring damper mechanism and is incorporated herein by reference. Strike bracket 108 is attached to left drawer slide 104 in a fashion so that it does not move as the drawer opens or closes. Cable arm bracket 130 is attached to the right drawer slide 106 and is also positioned so as not to move as the drawer opens or closes. The left drawer slide is slidingly engaged with left rear mounting bracket 362. The right drawer slide is slidingly engaged with right rear mounting bracket 360.

The powered vanity system includes switch enclosure 110. Switch enclosure 110 is fixed to the drawer bottom and moves as the drawer moves. Switch enclosure 110 is positioned so that pressure switch arm 112 gradually impinges on strike bracket 108 when the drawer is closed, as will be further described. Switch enclosure 110 is connected by switch cable 116 to plug mount box 308 through plug access hole 118. Plug mount box 308 is further connected to power supply cable 114 which is held in place by cable mounts 120. Power supply cable 114 is routed to hinged cable manager 202. Hinged cable manager 202 is further connected to cable arm bracket 130, as will be further described.

Figure 2:
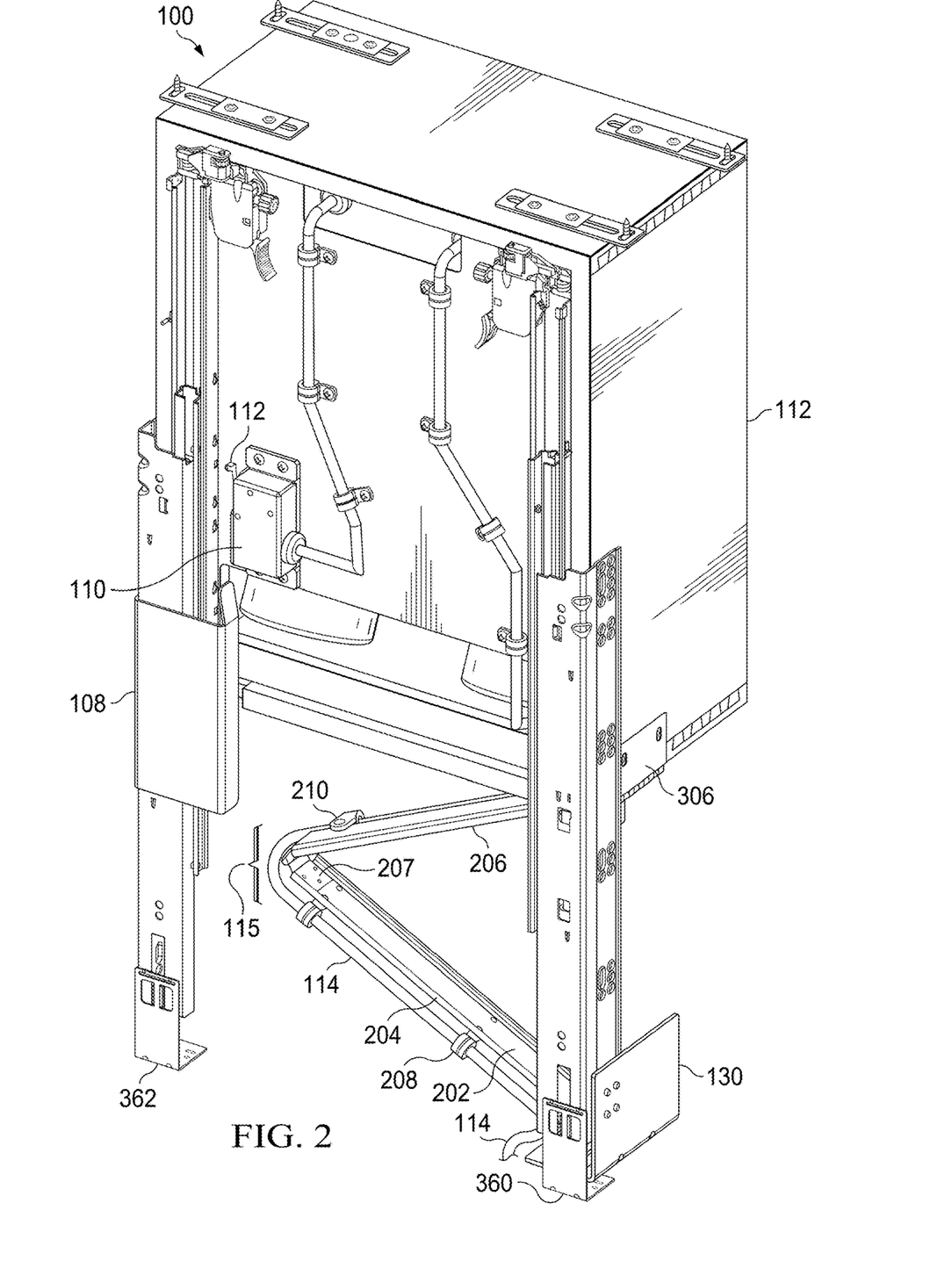
FIG. 2 is an isometric drawing of a preferred embodiment including a view of the underside of a drawer in an open position.

In FIG. 2, the underside of powered vanity system 100 is shown in the opened position.

Switch enclosure 110 can be seen to have moved out of alignment with strike bracket 108. In this position, pressure switch arm 112 is no longer in contact with strike bracket 108. In a preferred embodiment, switch enclosure 110 is positioned relative to strike bracket 108 such that pressure switch arm 112 engages strike bracket 108 at approximately the same time as the soft close mechanisms of the drawer slides are activated when the drawer is closed. In a preferred embodiment, engagement between pressure switch arm 112 and strike bracket 108 and activation of the soft close mechanisms occurs when the drawer face is about 2" from the cabinet frame.

Hinged cable manager 202 is attached to the back of the drawer box by hinged drawer bracket 306 and to right drawer slide 106 by cable arm bracket 130, as will be further described. Hinged cable manager 202 includes extension arm 204 and extension arm 206. Extension arm 204 includes a set of cable mounts 208 which extend from the bottom of the extension arm at intervals along its length. Extension arm 206 includes a set of cable mounts 210 which extend from the top of the extension arm at intervals along its length. Extension arm 204 and extension arm 206 are connected by hinged connection 207, which allows extension arm 204 to articulate relative to extension arm 206. Power supply cable 114 extends out of the drawer box to the hinged cable manager, where it is positioned through set of cable mounts 210, and set of cable mounts 208. As power supply cable 114 traverses the cable mounts it creates cable hinge section 115. In cable hinge section 115, power supply cable 114 extends generally vertically along hinged connection 207. This is important so that when extension arm 206 and extension arm 204 are closed, the power supply cable is not crimped or bent at acute angles. Power supply cable 114 then extends down past cable arm bracket 130 to a source of power (not shown).

Figure 3:
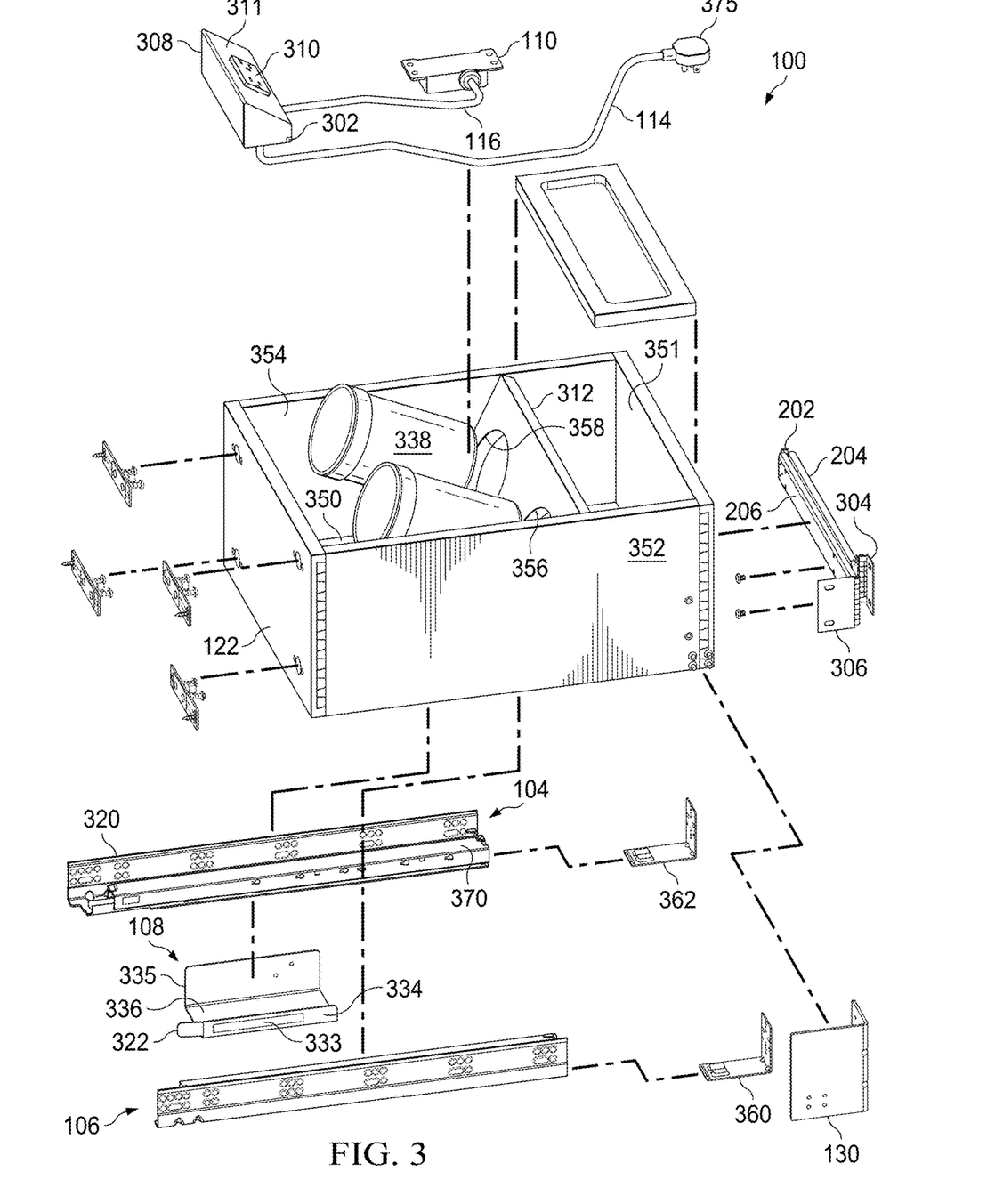
FIG. 3 is an exploded isometric drawing of a drawer of a preferred embodiment.

FIG. 3 shows an exploded view of the powered vanity system. Plug mount box 308 is located on drawer bottom 350 of the drawer box adjacent the inside of drawer face 122. The base of the plug mount box is larger than the plug access hole. In the preferred embodiment, the plug mount box has a generally trapezoidal cross-section so as to provide ease of access to outlet 310. Outlet 310 is installed on top angled surface 311 of plug mount box 308. LED 302 is located at the base of the plug mount box facing the interior of the drawer. Plug mount box 308 is connected to power supply cable 114 and switch cable 116.

The interior of the drawer box further includes angled implement tray 312 mounted between right drawer side 352 and left drawer side 354. A set of implement canisters 338 fits within holes 356 and 358 in angled implement tray 312 for storage of electrical appliances. In a preferred embodiment, implement canisters 338 are formed from a stainless steel material which is resistant to heat generated by various appliances, when in use.

Strike bracket 108 includes integrally formed mount plate 335, spacer plate 336 and vertical guide 334. In another embodiment, vertical guide 334 includes reflector 333, to be used with an optical trigger, as will be further described. Mount plate 335 and vertical guide 334 are substantially parallel. Spacer plate 336 is generally perpendicular to both the mount plate and the vertical guide. Mount plate 335 is rigidly attached to left slide vertical mount flange 320 of left drawer slide 104 and does not move as the drawer is opened or closed. The mount plate is positioned on the left slide vertical mount flange so that pressure switch 408 is engaged by ramp 322 exactly as the "slow-close" mechanisms of the left drawer slide and the right drawer slide are engaged as the drawer is closed or disengaged as the drawer is opened. The position of the mount plate relative to the left slide vertical mount flange is important so as to time the fading of the LED light source to correspond with the time that is required for the "slow-close" mechanisms to automatically close the drawer.

Spacer plate 336 extends under left drawer slide 104 and allows sufficient clearance to accommodate telescoping movement of left slide intermediate rail 370 when the drawer is opened or closed. Ramp 322 which extends from vertical guide 334 at a preferred angle of between 5° and 25° toward the left drawer slide. The ramp is important to minimize the impact of the pressure switch arm on strike bracket 108 to reduce mechanical wear on the pressure switch over time.

Hinged cable manager 202 includes hinged wall bracket 304 connected to extension arm 204. Hinged wall bracket 304 allows extension arm 204 to pivot with respect to cable arm bracket 130. Hinged drawer bracket 306 is connected to extension arm 206. Hinged drawer bracket 306 allows extension arm 206 to pivot with respect to the drawer box. The drawer bracket is attached to right drawer side 352 adjacent drawer back 351. When the drawer is closed, the hinged cable manager is collapsed and the extension arms are stored adjacent each other. When the drawer is opened, the hinged cable manager is extended and the extension arms move into an articulated position.

Figure 4A:
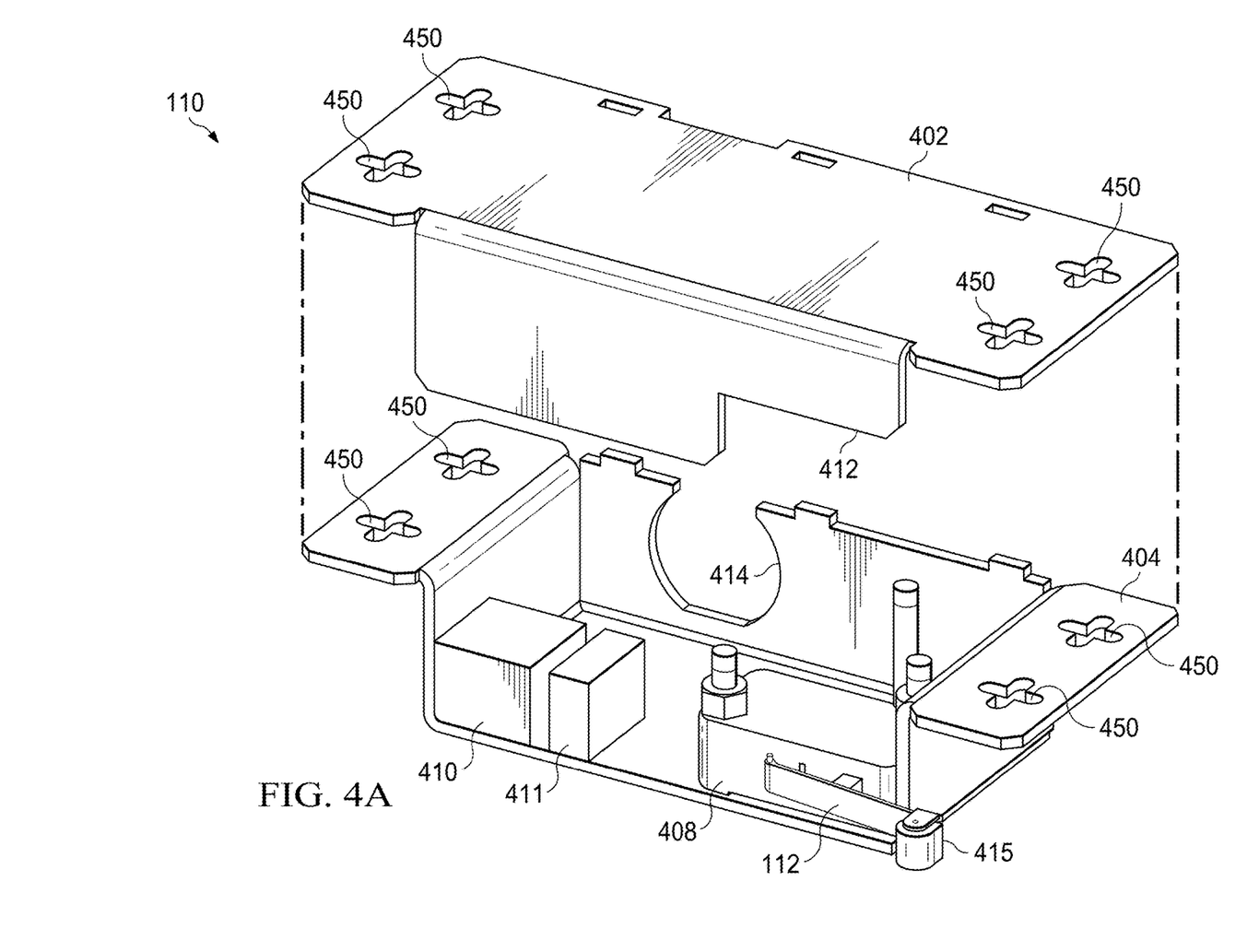
FIG. 4A is an isometric drawing of the interior of the switch enclosure of a preferred embodiment.

FIG. 4A shows details of switch enclosure 110. Switch enclosure 110 includes enclosure bottom 404 and enclosure top 402. Enclosure top 402 is preferably secured to enclosure bottom 404 by welding or removable fasteners. Screws adjustably secure the enclosure bottom and enclosure top to the bottom of the drawer box through "cross-star" holes 450. Cross-star holes 450 allow adjustment of the switch enclosure both "side-to-side" and "front-to-back" with respect to the drawer box and the strike bracket. The ability to adjust the position of the switch enclosure is important because it allows the travel of the pressure switch arm to be adjusted with respect to strike bracket 108.

Enclosure bottom 404 includes cable access hole 414 and is designed to accommodate wiring to pressure switch 408, dimmer circuit 410 and step down AC/DC converter 411. Pressure switch arm 112 is pivotally attached to pressure switch 408 and is spring loaded in an extended position. Pressure switch arm 112 includes contact roller 415 pivotally mounted at its distal end. Pressure switch 408 is securely attached to the enclosure bottom.

Figure 4B:
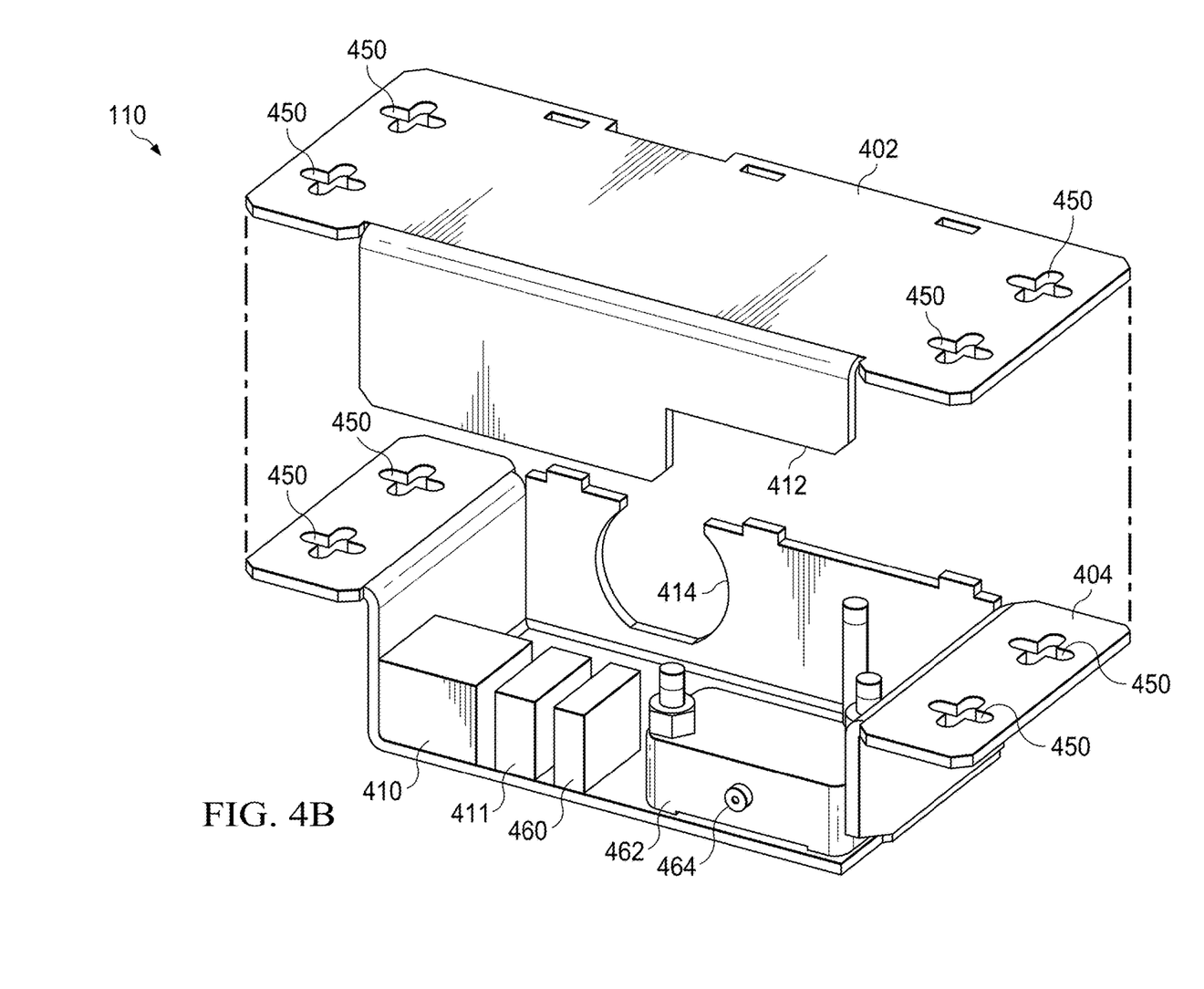
FIG. 4B is an isometric drawing of the interior of the switch enclosure of an alternate embodiment.

Referring to FIG. 4B, in another embodiment, pressure switch 408 can be replaced by optical sensor 462 directed toward reflector 333 of vertical guide 334. The optical sensor includes lens 464 which focuses light on reflector 333, so that as reflector 333 is adjacent the lens, light is reflected back to the sensor and acts as a trigger to activate relay 460. The relay performs the same function as the pressure switch. In a preferred embodiment, the optical sensor is an infrared sensor Part No. CY-121A-P available from Digi-key Electronics of Thief River Falls Minnesota, triggering an appropriate double pole, single throw relay housed in step down AC/DC converter 411.

Enclosure top 402 includes switch arm access hole 412. Pressure switch arm 112 extends through switch arm access hole 412 at a sufficient distance so that contact roller 415 may impinge on ramp 322 and vertical guide 334, as will be further described.

Dimmer circuit 410 is attached to the enclosure bottom and connected to pressure switch 408 and step down AC/DC converter 411. The step down AC/DC converter may also enclose a relay used in conjunction with an alternate embodiment. The switch cable is attached to the dimmer circuit, as will be further described.

Figure 5A:
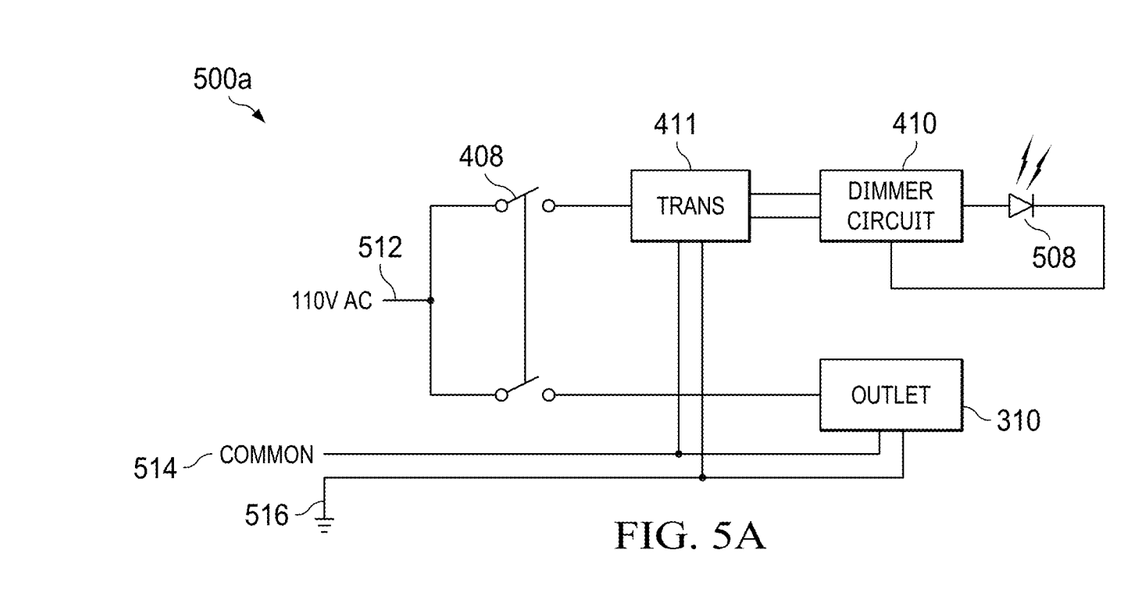
FIG. 5A is a schematic diagram of control circuit of a preferred embodiment.

Referring to FIG. 5A, a preferred embodiment of control circuit 500a will be described. Control circuit 500a includes pressure switch 408 connected to 110 VAC supply source 512 and step down AC/DC converter 411. Pressure switch 408 is also connected to outlet 310. In a preferred embodiment, pressure switch 408 is a double pole single throw normally closed spring loaded switch rated at 15 Amps. Step down AC/DC converter 411 is also connected to common 514 and ground 516. Step down AC/DC converter 411 changes the 110 VAC supply voltage to a regulated 12V DC current suitable to power dimmer circuit 410 and LED 508. The step down AC/DC converter is preferably Part No. RACD04-350 available from RECOM Power, Inc. of Arvada, Colorado. Step down AC/DC converter is connected to dimmer circuit 410. Dimmer circuit 410 is connected to LED 508. The dimmer circuit ramps voltage to the LED light source up or down over a predetermined period of time to provide a smooth transition for the LED between "on" and "off" states. The dimmer circuit may also be used to change the color of light produced by the LED light source. In a preferred embodiment, the predetermined period of time is set to correspond to the engagement of the "soft close" mechanism of the drawer slides so that the LED light source begins to dim as the drawer begins to automatically close. Similarly, as the drawer is opened, the predetermined time is set so as to fade the light source to a full "on" state as the drawer is opened. In a preferred embodiment, dimmer circuit 410 is the 12V, 2 Amp "curve" fade-in, fade-out dimmer available from Oznium, of Pagosa Springs, Colorado. In a preferred embodiment, LED 508 is Part No. 2040-1866 available from Custom Dynamics of Tewksbury, Maryland. Common 514 is further connected to outlet 310. Outlet 310 is also connected to ground 516.

Figure 5B:
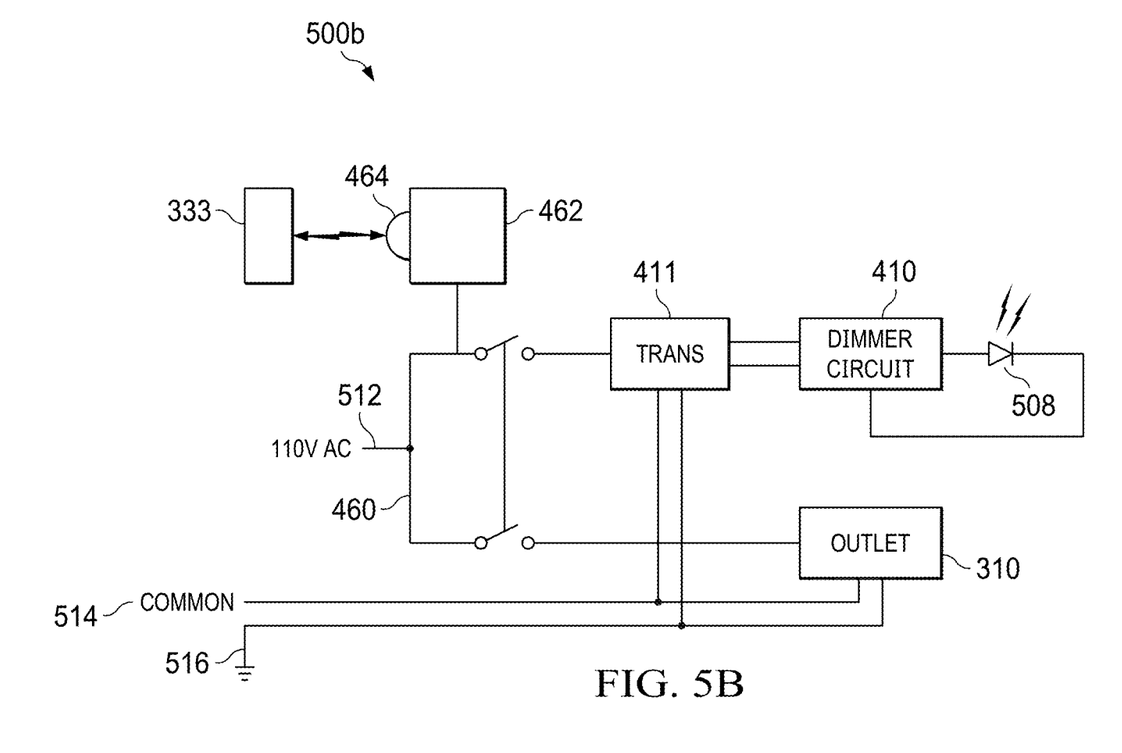
FIG. 5B is a schematic diagram of a control circuit of an alternate preferred embodiment.

Referring also to FIG. 5B, control circuit 500b illustrates a preferred embodiment where lens 464 of optical sensor 462 focuses light on reflector 333. When the reflector is directly adjacent the lens, the optical sensor provides a signal to open the relay, thus depowering the dimmer circuit and outlet. Likewise, when lens 464 is not adjacent reflector 333, no reflection is received by the optical sensor which then activates relay 460 to power the dimmer circuit and outlet.

Figure 6:
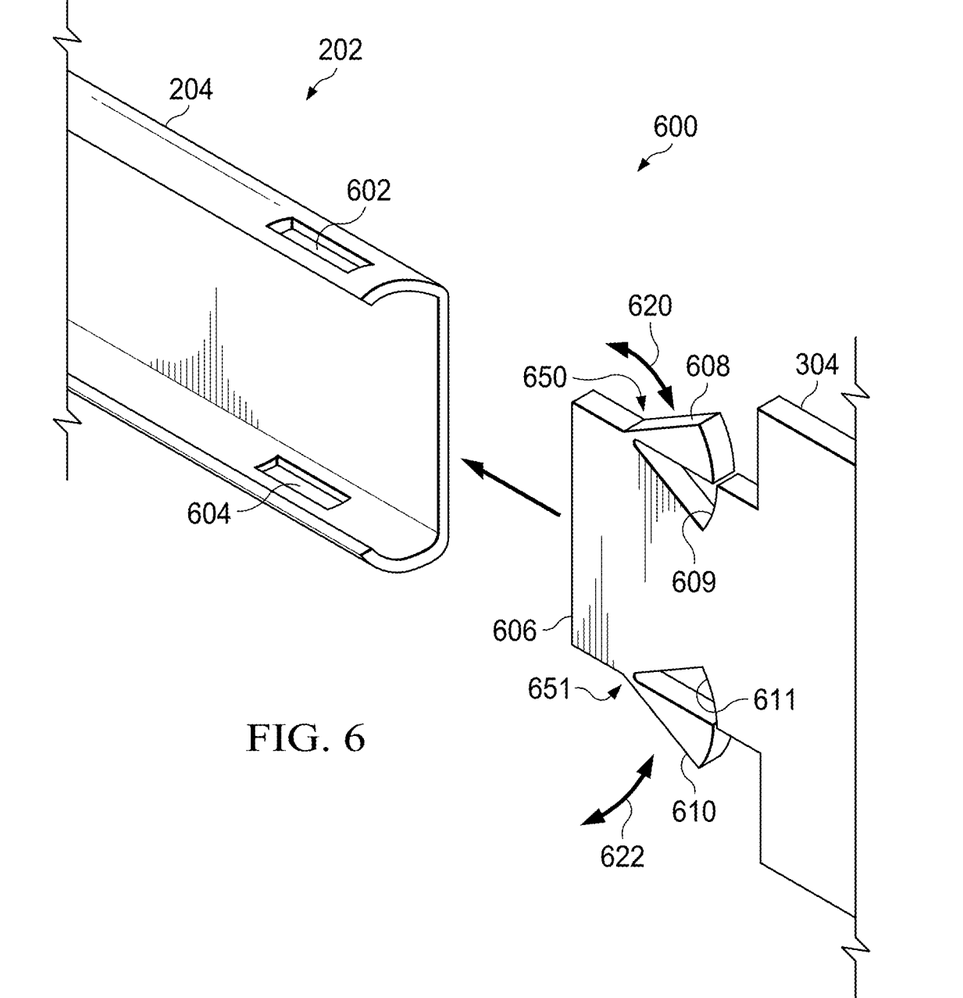
FIG. 6 is an exploded isometric drawing of a preferred embodiment of a cable manager quick disconnect coupling.

Referring to FIG. 6, a preferred embodiment of cable manager quick disconnect coupling 600 will be described.

Extension arm 204 includes slot 602 and slot 604 at its distal end. Slot 602 and slot 604 are diametrically opposed, and in a preferred embodiment they are each rectangular and oriented parallel to the long axis of the extension arm.

Hinged wall bracket 304 includes connection flange 606. Connection flange 606 includes diametrically opposed latch 608 and latch 610. Both latch 608 and 610 are generally triangular. Latch 608 fits into triangular receiving bay 609. Latch 610 fits into triangular receiving bay 611. In a preferred embodiment, latch 608 and latch 610 are connected to the connection flange at spring junction 650 and spring junction 651, respectively. Spring junctions 650 and 651 are formed of spring steel and resiliently bias the latches outward. When connection flange is advanced into extension arm 204, latch 608 automatically engages slot 602 and latch 610 automatically engages slot 604, along movement arcs 620 and 622, respectively. Once engaged, latch 608 protrudes outwards to releasably lock into position in slot 602. Likewise, latch 610 protrudes outwards to releasably lock into slot 604, thereby preventing movement of hinged wall bracket 304 with respect to extension arm 204.

Hinged wall bracket 304 may be removed from extension arm 204 by compressing latch 608 and latch 610 inwardly toward connection flange 606, into receiving bays 609 and 611, respectively, and withdrawing hinged wall bracket 304 from extension arm 204.

In use, left drawer slide 104 is attached to the cabinet carcass (not shown) by left rear mounting bracket 362. Cable arm bracket 130 is secured to right drawer slide 106 with screws. Cable arm bracket 130 is also secured to hinged wall bracket 304 with screws. Right drawer slide 106 is then attached to the cabinet carcass by right rear mounting bracket 360. Drawer box 102 is then removably affixed to the right drawer slide and the left drawer slide by use of right slide attachment clip 126 and left slide attachment clip 128, respectively. Hinged wall bracket 304 is removably attached to extension arm 204 by inserting connection flange 606 such that latch 608 engages slot 602 and latch 610 engages slot 604. Power supply cable 114 is removably connected to 110 VAC 512, common 514 and ground 516 through plug 375.

As drawer box 102 is opened, left drawer slide 104 and right drawer slide 106 are telescoped outwardly, thereby articulating hinged cable manager 202 and moving extension arm 204 away from extension arm 206. Contact roller 415, of pressure switch 408 rolls along vertical guide 334 to ramp 322. As contact roller 415 impinges on ramp 322, pressure switch arm 112 extends outwardly thereby activating pressure switch 408 and energizing control circuit 500a. Control circuit 500b functions in an analogous manner as shown in FIGS. 3 and 5B. Once energized, dimmer circuit 410 fades LED 508 to full power over a predetermined period of time, thereby slowly illuminating the interior of drawer box 102. In a preferred embodiment, the period of time is about 2 seconds. Energizing control circuit 500a or 500b also energizes outlet 310. Implements plugged into outlet 310 are then available for active use.

As drawer box 102 is closed, left drawer slide 104 and right drawer slide 106 are telescoped inwardly, until the soft close mechanisms are engaged to retract the drawer. As the soft close mechanisms are engaged, contact roller 415 impinges on ramp 322 of vertical guide 334 of strike bracket 108, thereby depressing pressure switch arm 112 and opening pressure switch 408 thereby discharging control circuit 500a or 500b. When control circuit 500a or 500b is discharged, dimmer circuit 410 fades LED 508 from full power "on" to "off" over a predetermined period of time, thereby slowly darkening the interior of drawer box 102. In a preferred embodiment, the period of time is about 2 seconds.

Drawer box 102 may be disengaged and removed from the cabinet carcass removing power supply cable 114 by disengaging plug 375. Drawer box 102 is then disengaged from right drawer slide 106 and left drawer slide 104 by disengaging right slide attachment clip 126 and left slide attachment clip 128, respectively. Hinged wall bracket 304 is then detached from extension arm 204 by compressing latch 608 and latch 610 and removing connection flange 606 from extension arm 204.

The invention claimed is:

1. A powered drawer comprising:
   a drawer box, having a front portion, releasably fixed to a set of drawer slides;
   a power outlet located in the front portion;
   an optical trigger, coupled to a relay, and installed on a bottom of the drawer box, adjacent to and directed toward a first drawer slide of the set of drawer slides;
   a power cable connecting the relay and the power outlet;
   a cable manager, attached to the drawer box, and supporting the power cable; and
   wherein the relay deactivates the power outlet when the drawer box is in a closed position;
   wherein the relay activates the power outlet when the drawer box is in an opened position.

2. The powered drawer of claim 1:
   wherein the optical trigger receives a reflection from the first drawer slide when the drawer box is in the closed position;
   wherein the optical trigger receives no reflection from the first drawer slide when the drawer box is in the opened position.

3. The powered drawer of claim 2, further comprising:
   a bracket attached to the first drawer slide;
   wherein the bracket includes a reflector adjacent the optical trigger.

4. The powered drawer of claim 3, wherein the optical trigger further comprises a lens for focusing a light signal on the reflector.

5. The powered drawer of claim 3, further comprising:
   a light source, fixed within the drawer box; and
   a dimmer circuit operatively connected between the light source and the relay;
   wherein the dimmer circuit ramps a voltage level to the light source down as the drawer box transitions to the closed position from the opened position.

6. The powered drawer of claim 5, further comprising:
   an outlet housing supporting the power outlet; and
   the light source attached to the outlet housing;
   wherein the dimmer circuit ramps the voltage level to the light source up when the power outlet is activated.

7. The powered drawer of claim 1:
   wherein the cable manager comprises a first extension arm connected to a second extension arm by a hinge; and
   wherein the first extension arm and the second extension arm are collapsed when the drawer box is in the closed position;
   wherein the first extension arm and the second extension arm are articulated when the drawer box is in the opened position.

8. The powered drawer of claim 7:
   wherein the first extension arm further comprises a top section;
   wherein the second extension arm further comprises a bottom section;
   wherein the power cable includes a vertical drop down section; and
   wherein the power cable is attached to the top section and the bottom section;
   wherein the power cable is not attached to the first extension arm and the second extension arm over the vertical drop down section.

9. The powered drawer of claim 1, further comprising:
   a first set of cable mounts attached to the drawer box;
   wherein the power cable is attached to the drawer box by the first set of cable mounts.

10. The powered drawer of claim 1, further comprising:
    an angled implement tray located in the drawer box; and
    a set of metallic implement cannisters removably positioned in the angled implement tray.

11. The powered drawer of claim 1, wherein the cable manager further comprises:
    a quick disconnect coupling releasably attached to a hinged wall bracket; and
    the hinged wall bracket further comprising a connection flange with a set of diametrically opposed flexible latches;
    wherein compression of the set of diametrically opposed flexible latches allows an extension arm of the cable manager to disconnect from the hinged wall bracket.

12. A powered vanity system for providing movable electrical power, comprising:
    a drawer box having a face plate and a back panel;
    a first slide attached to the drawer box;
    a second slide attached to the drawer box;
    a power outlet, adjacent the face plate;
    a cable manager, attached to the drawer box, wherein the cable manager is expanded when the drawer box is in an opened position and is collapsed when the drawer box is in a closed position;
    an optical trigger, installed on a bottom of the drawer box operatively adjacent the first slide;
    a power cable, connected to the power outlet and the optical trigger attached to the cable manager; and
    a control circuit, operatively connected to the power outlet and the optical trigger, for discharging the power outlet when the drawer box is in the closed position and for charging the power outlet when the drawer box is in the opened position.

13. The powered vanity system of claim 12, further comprising:
    a bracket, having a vertical switch guide plate, fixed to the first slide; and
    a lens, attached to the optical trigger, wherein the lens is directed toward the vertical switch guide plate when the drawer box is in the closed position and wherein the lens is not directed toward the vertical switch guide plate when the drawer box is in the opened position.

14. The powered vanity system of claim 13, further comprising:
a reflective surface formed on the vertical switch guide plate;
wherein the lens produces light which impinges on the reflective surface as the drawer box moves from the opened position to the closed position.

15. The powered vanity system of claim 12, wherein:
the cable manager further comprises a first extension arm articulatively connected to a second extension arm; and
the power cable is attached to the first extension arm and the second extension arm through an untethered vertical drop down section.

16. The powered vanity system of claim 12, further comprising:
a light source, mounted in the drawer box, facing an interior of the drawer box;
wherein the light source is illuminated when power is supplied to the power outlet.

17. The powered vanity system of claim 16, further comprising:
a dimmer circuit, operatively connected to the optical trigger.

18. The powered vanity system of claim 12, further comprising:
a power outlet mounting enclosure having an inwardly angled mounting surface;
wherein the power outlet is fixed to the inwardly angled mounting surface.

19. The powered vanity system of claim 12, further comprising:
an angled implement tray attached to the drawer box; and
a set of implement canisters supported by the angled implement tray.

20. The powered vanity system of claim 12, further comprising:
a switch enclosure, adjustably attached to the drawer box;
wherein the switch enclosure houses the optical trigger.

21. The powered vanity system of claim 12, wherein the optical trigger further comprises:
a relay operatively connected to a dimmer circuit, and
the dimmer circuit is operatively connected to a light source inside the drawer box.

22. The powered vanity system of claim 21, wherein:
the first slide further comprises a first soft close mechanism; and
the second slide further comprises a second soft close mechanism.

23. The powered vanity system of claim 22, wherein the first soft close mechanism and the second soft close mechanism are positioned to close the drawer box as the dimmer circuit dims the light source.

* * * * *